(12) United States Patent
Leuthold

(10) Patent No.: US 6,832,053 B2
(45) Date of Patent: Dec. 14, 2004

(54) DELAYED INTERFERENCE WAVELENGTH CONVERTER AND/OR 2R REGENERATOR

(75) Inventor: Juerg Leuthold, Eatontown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 575 days.

(21) Appl. No.: 09/871,393

(22) Filed: May 31, 2001

(65) Prior Publication Data

US 2002/0080469 A1 Jun. 27, 2002

Related U.S. Application Data

(63) Continuation-in-part of application No. 09/745,785, filed on Dec. 22, 2000.
(60) Provisional application No. 60/276,262, filed on Mar. 15, 2001.

(51) Int. Cl.[7] .............................................. H04B 10/02
(52) U.S. Cl. ..................... 398/175; 398/176; 398/154; 398/155; 359/332; 359/326; 359/333; 359/344
(58) Field of Search .................................. 398/175, 176, 398/154, 155; 359/332, 326, 333, 344

(56) References Cited

U.S. PATENT DOCUMENTS

| | | | | |
|---|---|---|---|---|
| 6,108,125 A | * | 8/2000 | Yano ........................... | 359/344 |
| 6,208,454 B1 | * | 3/2001 | Koren et al. ................ | 359/326 |
| 6,229,633 B1 | * | 5/2001 | Roberts et al. ............. | 398/9 |
| 6,335,819 B1 | * | 1/2002 | Cho et al. ................... | 359/333 |
| 6,437,905 B1 | * | 8/2002 | Joyner et al. ............... | 359/332 |
| 6,608,854 B1 | * | 8/2003 | Watanabe .................... | 372/96 |
| 6,614,582 B1 | * | 9/2003 | Mikkelsen et al. .......... | 359/326 |
| 6,678,086 B2 | * | 1/2004 | Dave et al. .................. | 359/326 |
| 2002/0080453 A1 | * | 6/2002 | Leuthold et al. | |

OTHER PUBLICATIONS

Juerg Leuthold et al., "Multimode Interference Couplers for the Conversion and Combining of Zero– and First–Order Modes", *IEEE Journal of Lightwave Technology*, vol. 16 No. 7, Jul. 1998, pp. 1228–1239.

Juerg Leuthold et al., "Spatial mode filters realized with multimode interference couplers", *Optics Letters*, vol. 21, No. 11, Jun. 1, 1996, pp. 836–838.

* cited by examiner

*Primary Examiner*—Hanh Phan
(74) *Attorney, Agent, or Firm*—Barry H. Freedman

(57) ABSTRACT

A delayed interference all-optical wavelength converter is arranged to convert and reshape a pulsed input signal $P_{in}$ at $\lambda_1$ into the wavelength converted signal $P_{conv}$ at $\lambda_2$, where $\lambda_1$ and $\lambda_2$ are different. A delayed interference all-optical wavelength regenerator is similar, but is arranged to reshape a pulsed input signal $P_{in}$ into the wavelength converted signal $P_{conv}$, where the wavelengths of the input signal and the converted signal are the same. The converter/regenerator comprises an input-signal coupling unit for receiving the pulsed input signal and supplying it to one input of a modulation section, the other input to which is a carrier signal $P_{cw}$. The output of the modulation section $P_{int}$, which is generally speaking, a phase modulated signal which may also have an amplitude modulated component, is applied to a delay interference section arranged to transform $P_{int}$ into a primarily amplitude-modulated signal. A wavelength filtering element that can enable partial or even complete input-signal wavelength filtering, is either a part of the modulation section, the coupling unit, the delay-interference section or an integral part of the whole configuration.

19 Claims, 5 Drawing Sheets

TABLE 1: POSSIBLE CONFIGURATIONS COMPRISING COUPLING UNITS AND DELAY-INTERFERENCE SECTIONS, THAT ALLOW FOR WAVELENGTH FILTERING (MARKED WITH AN 'X')

|  | FIG. 3(a) | FIG. 3(b) | FIG. 3(c) | FIG. 3(d) | FIG. 3(e) | FIG. 3(f) | FIG. 3(g) |
|---|---|---|---|---|---|---|---|
| FIG. 2(a) | X | X | X | X | X | X | X |
| FIG. 2(b) | X | X | X | X | X | X | X |
| FIG. 2(c) | X | X | X | X | X | X | X |
| FIG. 2(d) | X | X | X | X | X | X | X |
| FIG. 2(e) | X | X | X | X | X | X | X |
| FIG. 2(f) | X | X | X | – | – | – | – |
| FIG. 2(g) | X | X | X | – | – | – | – |

US 6,832,053 B2

DELAYED INTERFERENCE WAVELENGTH CONVERTER AND/OR 2R REGENERATOR

CROSS-REFERENCE TO RELATED APPLICATION

This application is a continuation in part, and claims the priority of application Ser. No. 09/745,785, filed Dec. 22, 2000, and entitled "3R Optical Signal Regeneration", which application is assigned to the same assignee as the present application. This application claims the priority of Provisional Application Ser. No. 60/276,262, filed Mar. 15, 2001.

FIELD OF THE INVENTION

This invention relates generally to the field of optical communications, and in particular, to a method and apparatus for providing all-optical wavelength conversion and/or 2R regeneration (reamplification and/or reshaping) with wavelength filters.

BACKGROUND OF THE INVENTION

All-optical wavelength converters are increasingly important as alternatives to optical-to-electrical- to-optical wavelength converters in wavelength division multiplexing (WDM) optical communications systems. Such converters are needed to switch from one wavelength to another or also to regenerate a degraded signal.

All-optical wavelength converters exploit the effect of an input-signal in a nonlinear medium to transfer the input-signal information by means of the nonlinear medium onto a continuous wave (cw) signal. The cw signal (which might be at a new wavelength) then carries the information of the input-signal, and the input-signal itself is not used anymore. Since both the cw and the input-signal were guided into the same nonlinear medium, they have to be separated after wavelength conversion. While this separation can be done with an external wavelength filter, external wavelength filters add to the cost of a product. In addition, there are cases where the incoming wavelength and the converted wavelength have the same wavelength (e.g. if the device is used as a regenerator). In this case, an external wavelength filter can not separate the incoming and converted wavelength, and the device can not be used. In addition, external wavelength filters restrict the application range to cases where the wavelength of the converted signal does not change, since an external wavelength filter is usually tuned only to a single wavelength.

SUMMARY OF THE INVENTION

A delayed interference all-optical wavelength converter is arranged and operated to convert a pulsed input signal $P_{in}$ at $\lambda_1$ into the wavelength converted signal $P_{conv}$ at $\lambda_2$, where $\lambda_1$ and $\lambda_2$ are different. A delayed interference all-optical wavelength regenerator is similar, but is arranged and operated to reshape a pulsed input signal $P_{in}$ into the wavelength converted signal $P_{conv}$, where the wavelengths of the input signal and the converted signal may be different or the same. It is to be understood here that the arrangement of the present invention can be a wavelength converter and a wavelength regenerator at the same time, and that the functions performed by a regenerator or converter can include aspects or capabilities of the other. The converter/regenerator comprises an input-signal coupling unit for receiving the pulsed input signal and supplying it to one input of a modulation section, the other input to which is a carrier signal $P_{cw}$. The output of the modulation section $P_{int}$, which is generally speaking, a phase modulated signal which may also have an amplitude modulated component, is applied to a delay interference section that is arranged to transform $P_{int}$ into a primarily amplitude modulated signal. In accordance with the invention, a wavelength filtering element or arrangement that can enable partial or even complete input-signal wavelength filtering, is either a part of the modulation section, the coupling unit, the delay-interference section or an integral part of the whole configuration.

BRIEF DESCRIPTION OF THE DRAWINGS

The present invention will be fully appreciated by consideration of the following detailed description, which should be read in light of the accompanying drawing in which.

DETAILED DESCRIPTION

Figures 1, 5:
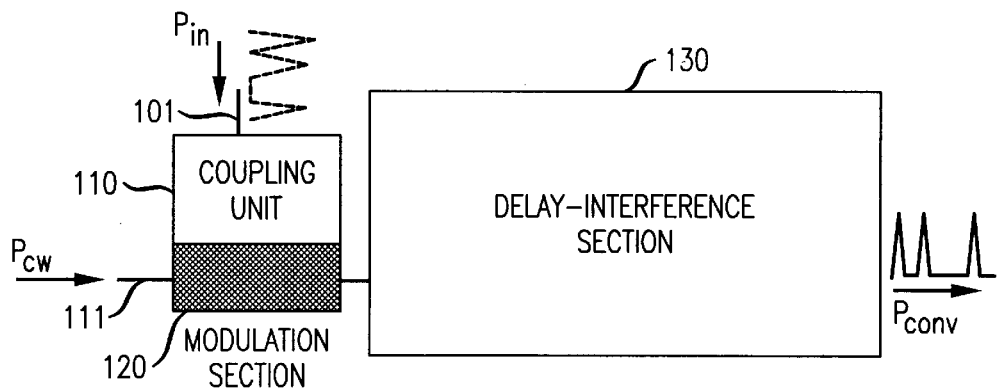
FIG. 1 is a block diagram illustrating the overall arrangement of a wavelength converter arranged in accordance with the principles of the present invention.
FIG. 5 is a table illustrating to inter-operability of various combinations of the arrangements shown in FIGS. 2 and 3.

Referring now to FIG. 1, there is shown a block diagram illustrating the overall arrangement of a wavelength converter/regenerator arranged in accordance with the principles of the present invention. For the purposes of the subsequent description, the arrangement will be explained as though it was a wavelength converter, such that the wavelength $\lambda_1$ of the input and the wavelength $\lambda_2$ of the output are intended to be different. However, it is to be understood throughout that unless specifically indicated otherwise, a corresponding arrangement could be used as a regenerator in which the input and output wavelengths are intended to be one and the same.

A pulsed input signal $P_{in}$ received on an optical input 101 is coupled via a coupling unit 110 into a first input of a modulation section 120 that, generally speaking, comprises an optically nonlinear medium. A continuous wave (cw) light signal $P_{cw}$ received on an optical input 111 is introduced into a second input to modulation section 120 as well. The nonlinear medium is a material that changes its optical characteristics, such as refractive index, gain or absorption, under the direct influence of light or the indirect influence of light, e.g. by means of temperature changes, voltage changes, current changes, that are related to this light. In this way, the input signal $P_{in}$ modulates the phase, and depending on the specific arrangement of the modulation section, also the amplitude of the co-propagating carrier (cw) signal $P_{cw}$. The power of the input pulses are chosen such that they modulate the phase of the cw signal by an amount of approximately $\pm\pi$ or less. The output of the modulation section 120, which is referred to as $P_{int}$, is mainly a phase modulated signal. This signal exits the modulation section 120, and is coupled into a delayed interference section 130, which is arranged to translate the phase modulated cw signal $P_{int}$ into an amplitude modulated signal.

Devices that could be exploited and used as part of modulation section 120 are, for example, semiconductor optical amplifiers (SOA) based on e.g. InGaAsP, InGaAlAs, GaAs, or other active semiconductor compounds, passive semiconductor materials such as doped or updoped $SiO_2$, $Si_xN_y$, and others, crystals, absorbers, optical fibers, glasses such as e.g. chalcogenite glasses, plastic based waveguiding materials, and certain liquids or gases. These materials have in common the fact that they change a characteristic, such as the refractive index and/or optical gain, by direct or indirect modulation of a light signal into the modulation section or a neighbour material. Persons skilled in the art will appreciate that other materials may be discovered and/or used to perform the desired modulation function.

A possible realization of a modulation material with partial or complete wavelength filtering characteristic is a material that absorbs the input-signal wavelength, but is transparent (for some time or all time) for the cw-signal. The material can be used for modulation of the cw-signal, if the process of absorbing the input-signal is accompanied by material property changes such as refractive index changes, which are seen by the cw-signal.

Coupling unit 110 is needed to introduce the input-signal $P_{in}$ either directly into the modulation section 120 or to introduce and modify the input-signal such that it can be used to change the refractive index of the modulation section. The arrangement of coupling unit 110 such that it can provide filtering capabilities, in accordance with the present invention, varies based upon the specific modulation concept that has been chosen. For example, in the case where modulation section 120 is implemented as a nonlinear material that changes its refractive index with the intensity of the light, coupling unit 110 can be arranged to introduce the input-signal as depicted in FIGS. 2(a)–(e).

Figure 2A:
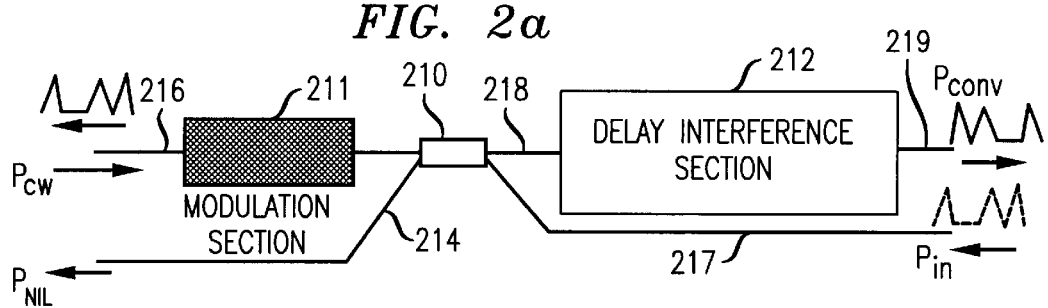
FIGS. 2(a) through 2(g) illustrate various embodiments of the invention, particularly with respect to implementation of coupling unit 110 of FIG. 1.

In FIG. 2(a), a coupler 210 is inserted between the modulation section 211 and the delay interference section 212. Coupler 210 is a bi-directional two-input, two-output coupler, arranged to (a) combine input signals, and (b) equally split the combined input signals among the two outputs. In this configuration, the input-signal $P_{in}$ is introduced into coupler 210 via input 217 in a counterpropagating manner, such that one-half of the output is applied as a first input to modulation section 211 and the other half of the output is discarded as the signal $P_{nil}$ on line 214. The carrier signal $P_{cw}$ is the second input to modulation section 211 via input 216. The output of coupler 210 on output 218 is applied to the delay interference section 212, forming the desired frequency converted output on output 219. The input signal $P_{in}$ does not couple into the delay interfernce section. In this way, a separate filter is not needed at the output of the delay interference section in order to separate the cw signal $P_{cw}$ from the input signal $P_{in}$. However, optical isolators (not shown) might be needed at the inputs 216 and/or 217 that receive the cw signal and/or the input signal to guarantee that no disturbing light signals propagate towards the sources.

Figure 2B:
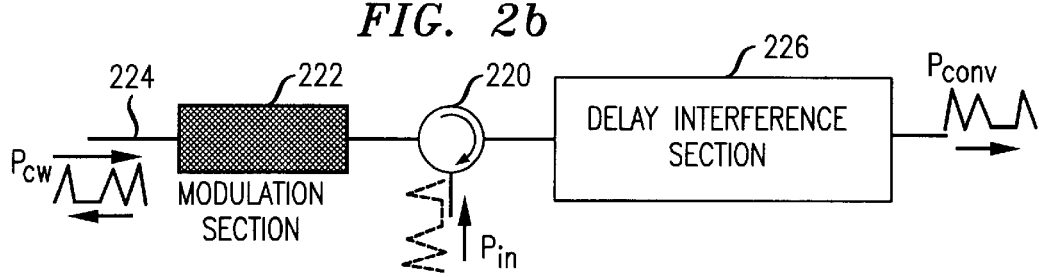

Referring now to FIG. 2(b), another arrangement of the present invention is shown, using an optical circulator 220 as a coupler to introduce the input signal $P_{in}$ into the modulation section 222. As in FIG. 2(a), the carrier signal $P_{cw}$ is the second input to modulation section 222 via input 224. The circulator 220 additionally couples the output of the modulation section 222 into the delay interference section 226, the output of which is the desired converted signal $P_{conv}$. Thus, the the input signal $P_{in}$ at $\lambda_1$ has been converted into the output signal $P_{conv}$ at $\lambda_2$, as desired.

Figure 2C:
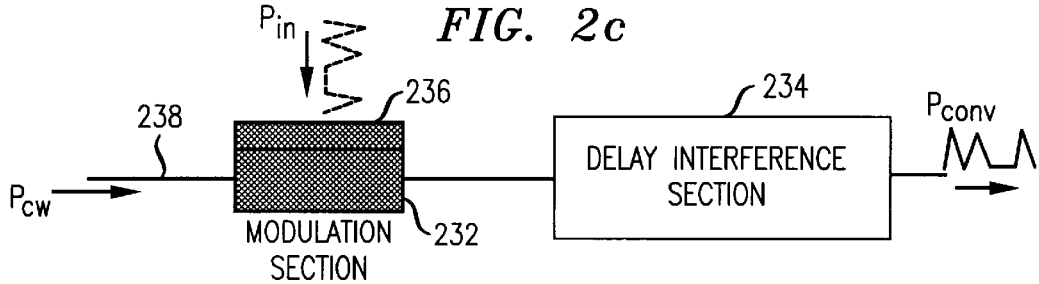

In FIG. 2(c) light at the input wavelength $\lambda_1$ is introduced perpendicular (or at an angle) to the propagation direction of the carrier signal $P_{cw}$ input 238 using for example a grating or prism 236 as a coupler. The grating or prism is directly connected to the modulation section 232, and is advantageously arranged such that little or no light is coupled into the waveguide that guides the output of the modulation section 232 to the delay-interference section 234.

Figure 2D:
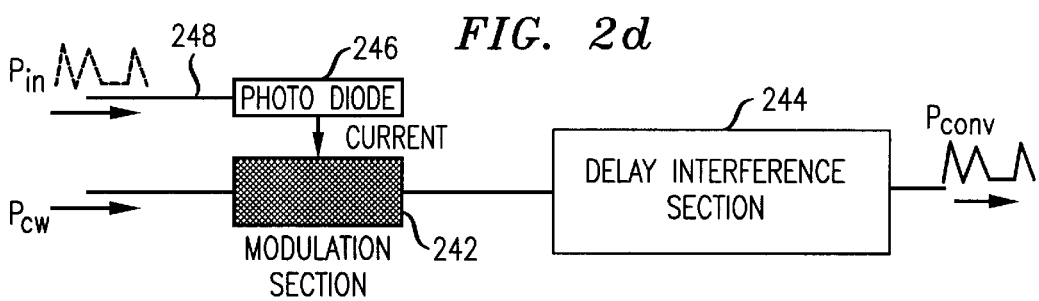

In FIG. 2(d), modulation of the refractive index is not provided by a nonlinear effect but instead by current modulation. In this embodiment, a sensor 246 (which is, for example, a photodiode) is used as the coupler and to detect the input signal. The electrical current output of the photodiode is then applied to the nonlinear medium comprising modulation section 242. In this embodiment, input signal filtering is actually performed in the coupler (i.e., in the photodiode) itself. The input signal is not guided into the modulation section 242 as an optical signal. Rather, the cw signal introduced into the modulation section on input 248 is modulated indirectly by applying electrical currents, voltages, new optical signals, or temperature changes from the sensor 246 that do not introduce disturbing light signals in the signal path.

Figure 2E:
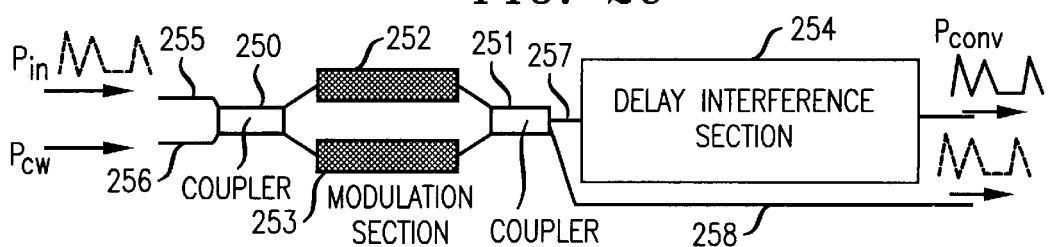

In FIG. 2(e), a coupler unit with a Mach-Zender interferometer (MZI) configuration is used. The modulation section comprises both arms 252 and 253 of the MZI, which are each connected to 2×2 input and output couplers 250 and 251, respectively. Input coupler 250 receives input signal $P_{in}$ on its first input 255 and the carrier signal $P_{cw}$ on its second input 256. To operate as a wavelength filter for the input signal, the phases, signal intensities and coupler splitting ratios are chosen such that the signal to be converted ($P_{cw}$) is coupled into the first output 257 of the output coupler 251, thereby guiding the signal into the delay interference section 254, while the input signal $P_{in}$ (that modulates the modulation section) is split off into the second output 258 of output coupler 251, and can be discarded.

Other coupling units that do not provide filtering of the input signal can be used in combination with a modulation section or delay-interference section, that provides filtering. Two examples of such coupling units are shown in FIGS. 2(f) and 2(g).

Figure 2F:
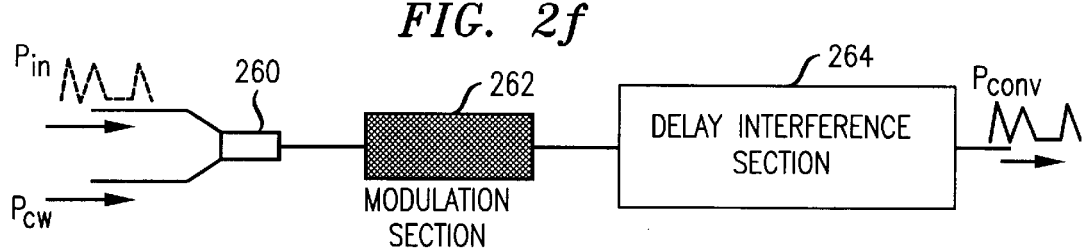
Figure 2G:
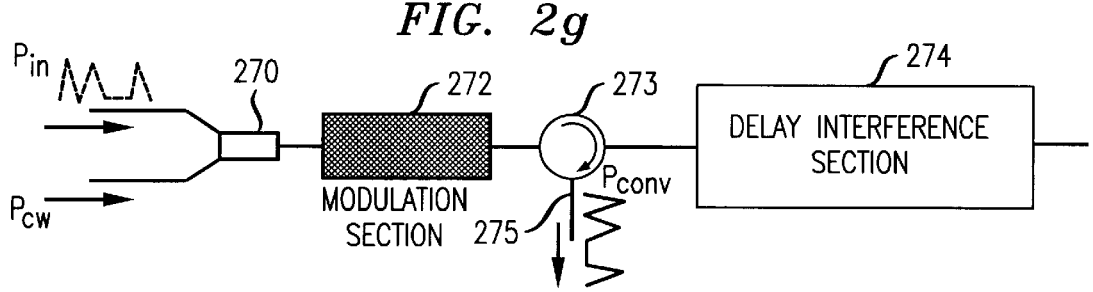

In FIG. 2(f), a coupler 260 having either a symmetric or asymmetric splitting ratios is used to couple the cw and input signals into modulation section 262 in a copropagating manner. The output of modulation section 262 is in turn applied to delay interference section 264. In FIG. 2(g), the cw and input signal are again coupled into a modulation section 272 with the help of a coupler 270. The output of modulation section 272 is then applied to a circulator 273. The signals then go from the circulator into the delay-interfernce section 274. If the delay-interference section is implemented using one of the arrangements shown in FIGS. 3(a)–(c) as described below, the wavelength converted signal $P_{conv}$ will be reflected back into the circulator 273 and coupled out into the additional port 275.

From the foregoing description, it is seen that many different arrangements for the coupling unit 110 of FIG. 1 are possible. As stated previously, the essence of the coupling unit 110 is, generally speaking, that the input signal is used to modulate the refractive index and eventually also the gain or absorption characteristics of the modulation section 120.

Turning now to FIGS. 3(a) through 3(g), there is shown various embodiments of the invention, particularly with respect to implementation of delay interference section 130 of FIG. 1. Generally speaking, delay interference section 130 is used to split the signal output from the modulation section 120 of FIG. 1, which for the purposes of description, will be referred to as intermediate signal $P_{int}$, into two signals, and then let these two signals propagate for different times (such as along different optical interference paths of different lengths) until they are recombined in a combiner. The combiner then allows constructive or destructive interference into the output, depending on the relative phase relations between the two split up signals. It is advantageous if there is a phase-shifter or/and a gain/absorbing section somewhere in between the interference path.

Before describing the individual embodiments of delay interference section 130, it is to be noted that the splitters and combiners used in this section may each be a fixed symmetric or asymmetric coupler; they may also be tunable, if desired. Accordingly, in the subsequent description, it is to be understood that while an ordinary delay line may be shown, such delay line may contain other elements that are not explicitly shown, such as a gain or absorbing element or an additional coupler to adapt signal intensities on the interferometer arms.

Figure 3A:
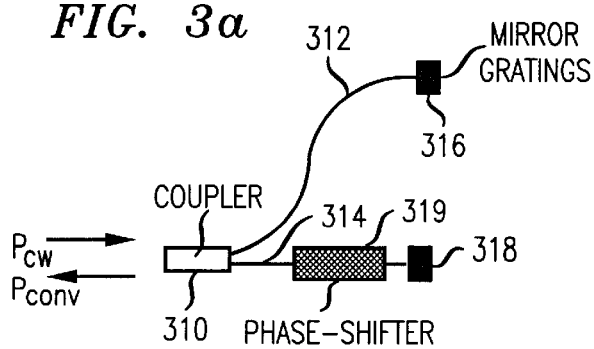
FIGS. 3(a) through 3(g) illustrate various embodiments of the invention, particularly with respect to implementation of delay interference section 130 of FIG. 1.
Figure 3B:
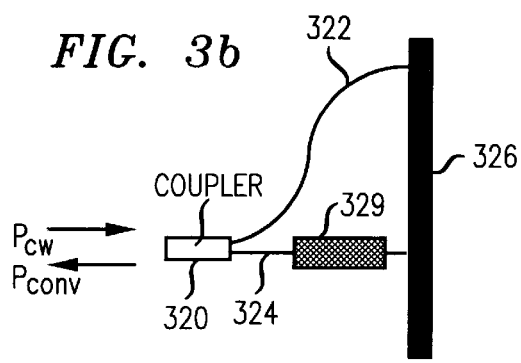
Figure 3C:
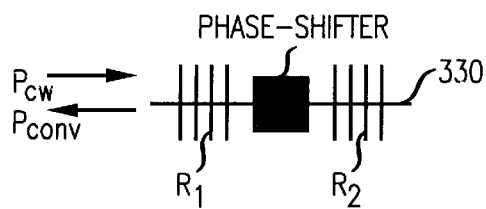

Several delay interferometer arrangements that enable input-signal wavelength filtering are shown in FIGS. 3(a)-3(c). In these embodiments, light splitters and combiners in the form of e.g. optical couplers, gratings, mirrors, polarization splitters, higher order mode couplers, are used in conjunction with a phase-control section or absorbing or gain media on at least one interference arm or for one part of the carrier signal respectively. Specfically, in FIG. 3(a), a coupler 310 splits the input $P_{int}$ into two parts, which are applied to two light guiding means 312 and 314, each of which is terminated with a partially reflecting surface 316, 318 respectively. Light guiding means 314 and/or 312 includes a phase shifter 319. With this arrangement, the cw light portion $P_{int}$, is reflected back into the coupler 310, whereas the portion of $P_{int}$ having the input-signal wavelenth is transmitted beyond the reflecting layer and thereby discarded.. The backward reflected light that has been recombined in the coupler 310 is then coupled out of the delay interference section, as represented by the signal $P_{conv}$ shown in FIG. 3(a). This coupling, not explicitly shown in the figure, may be done with a splitter, a circulator, or a similar element placed between the delay interference section 130 and the modulator section 120. FIG. 3(b) is similar to FIG. 3(a), in that it also includes a coupler 320 similar to coupler 310, a phase shifter 329 similar to phase shifter 319, and two light guiding means 322 and 324 similar to light guiding means 312 and 314. Light guiding means 322 and 324 are advantageously waveguides fabricated on a planar optical waveguide chip. In this arrangement, however, a single mirror 326 is used instead of individual reflecting surfaces 316 and 318.

In the embodiment of FIG. 3(c), an interferometer 330 comprising two partially reflecting areas interconnected by a light guiding means, is arranged so that one part of the input light $P_{int}$ is reflected back with probability R1 and the remaining part is reflected back with probability R2, a little bit later in time. The portion of $P_{int}$ representing the input signal passes the grating without being reflected backwards. Subsequently, the two backward reflected parts of $P_{int}$ interfere into the output. Again, the output light $P_{conv}$ is coupled out in the same manner as described in connection with FIGS. 3(a) and 3(b). It is generally advantageous if the light guiding means is arranged to provide a phase-shifting capability.

Figure 3D:
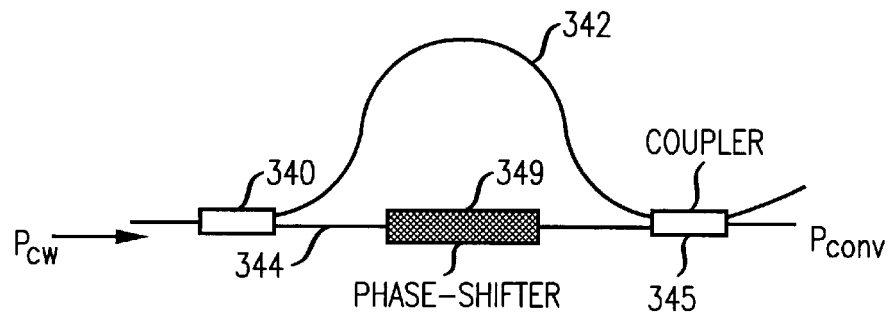

Other arrangements of delay interference section 130 that enable wavelength filtering in combination with a wavelength filtering modulation section 120 or coupling unit 110 are depcited in FIGS. 3(d) through 3(g). FIG. 3(d) shows an interferometer that includes an input-coupler 340, two interferometer arms 342, 344 of different length, and an output coupler 345. Phase shifter 349 is disposed in interferometer arm 344, although it is also possible to have phase-shifters in both of the interferomter arms or only in the other arm, i.e., arm 342. In this arrangement, the output $P_{conv}$ is derived from the output of coupler 345.

Figure 3E:
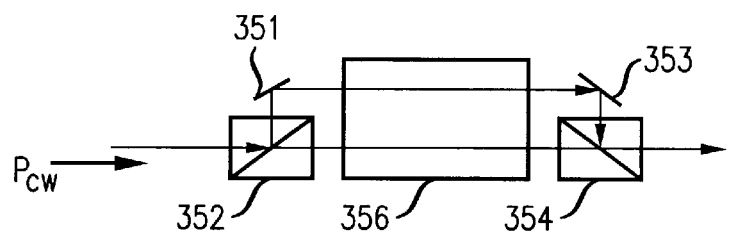

FIG. 3(e) shows an interferomter built with free-space optics elements. There is a splitter 352 at the input and a second splitter 354 at the output. One arm of the interferomter is longer than the other, by virtue of the fact that one portion of the light is reflected by mirrors 351, 353, while the other portion is not. There may be an additonal element 356 within the light path (either in one or both arms). This additional element might provide phase adpation, etc.

Figure 3F:
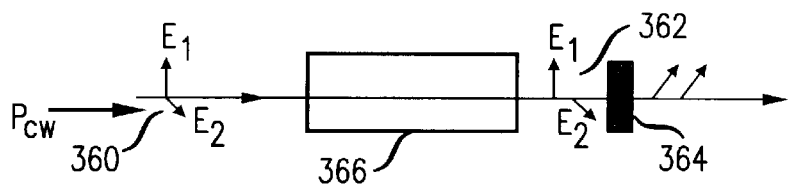

FIG. 3(f) shows an interferomter built from a birefringent crystal 366. The input light $P_{int}$ guided into crystal 366 (or other birefrinent media) is adjusted in a polarizing element 360 to provide two polarizations. One of the polarizations in the crystal propagates with faster speed than the other. At the output of the birefringent crystal 366, the light is guided into a second polarizer 362, and recombined in a combiner 364 onto a signal with one polarization. Additional phase-shifters and adapters might be interposed in the light path.

Figure 3G:
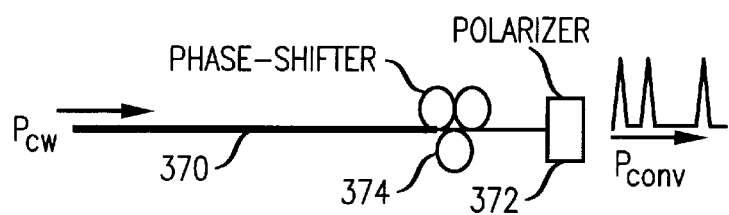

The embodiment of FIG. 3(g) includes a delay-interference section that is similar to the one described in FIG. 3(f). However, a birefringent fiber 370 (e.g. a PM fiber) is used as the birefringent media. In this embodiment, a phase shifter 374 and a polarizer 372 are placed directly in the light path.

Figure 4:
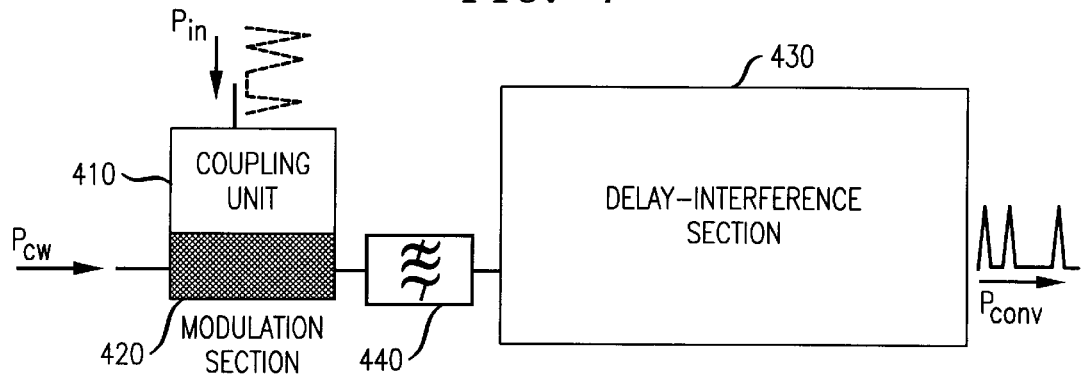
FIG. 4 illustrates an embodiment of the invention in which a filter is explicitly inserted into the arrangement.

In another embodiment of the present invention, as illustrated in FIG. 4, a filter 440 tuned for the input-signal wavelength is placed between the modulation section 420 and the delay-interference section 430. The filter 440 could be a selective grating filter, a Fabry-Perot filter or simply a selective absorber that mainly absorbs the input-signal wavelength. The filter could also be implented as a higher order mode filter that separates fundamental mode light from first order mode light signals. In particular, one could use so-called MMI-filters described by J. Leuthold et al. in Optics Letters, Vol. 21, No. 11, Jun. 1, 1996, pp. 836–838 or MMI-converter-combiners as described by J. Leuthold et al. in J. of Lightwave Technol., vol. 16, no. 7, pp. 1228–1239, July 1998. In such an implementation, the input signal could be coupled into the device as first order mode light, while the cw light could be coupled into the device as fundamental mode. The first order mode light could then be easily separated by means of these special MMIs. Implementation of a filter between the modulation section and delay-interference section can be very cost-effective when all the components are completely integrated on a single chip.

Referring now to FIG. 5, there is shown a table illustrating the inter-operability of various combinations of the arrangements shown in FIGS. 2 and 3. In the table, an "X" indicates that a configuration using a particular one of the coupling unit 110 arrangements of FIG. 2 in combination with a particular one of the delay interference section 130 arrangements of FIG. 3 will produce satisfactory results, in accordance with the principles of the present invention. Likewise, the absence of an "X" indicates that the combination is not recommended or suitable to achieve the intended result.

Figure 6A:
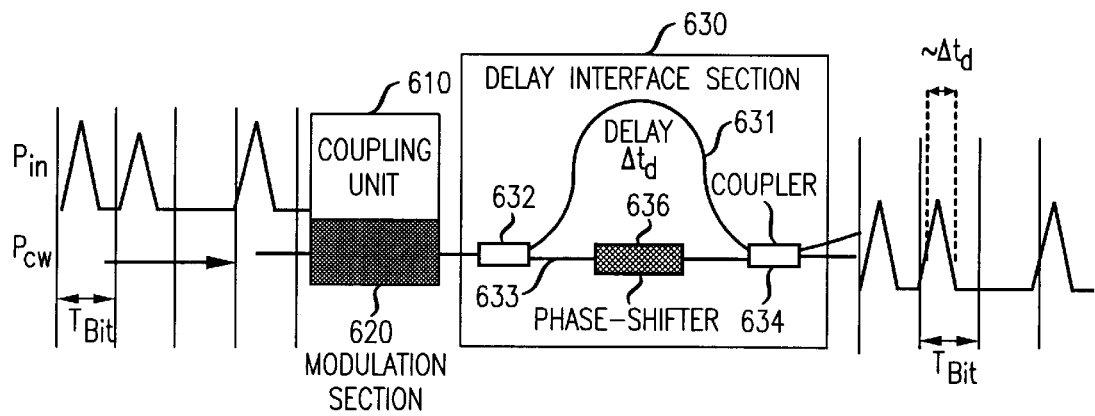
FIGS. 6(a) and 6(b) compare the operation of the present invention with the invention described in the parent application that forms a basis for this continuation in part application.
Figure 6B:
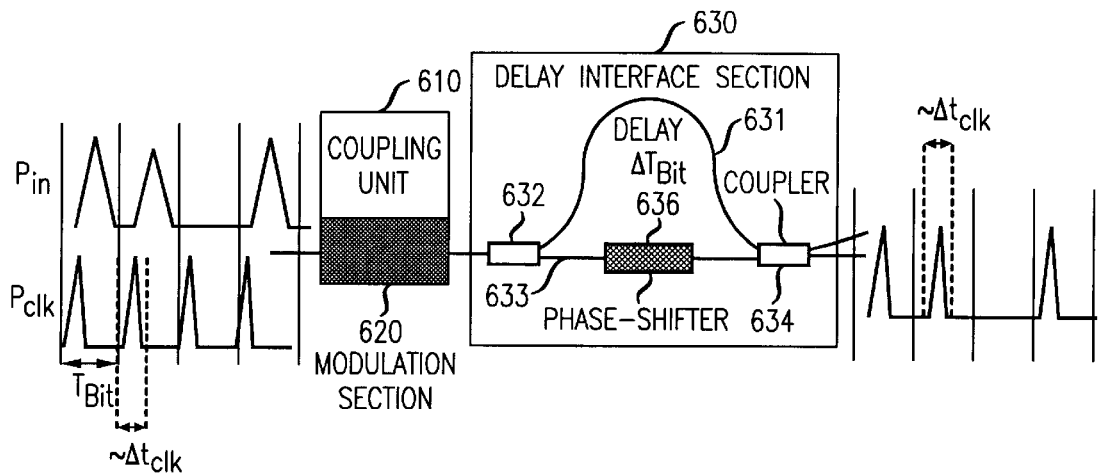

For the sake of completeness, FIGS. 6(a) and 6(b) compare the operation of the present invention with the invention described in the parent application that forms a basis for this continuation in part application, respectively. In both FIGS. 6(a) and 6(b), the same arrangement of components is shown. The input signal $P_{in}$ to be converted or regenerated is applied through coupling unit 610 to a modulation section 620, the output of which is applied to a delay interference section 630 that includes two arms 631, 633 of unequal length. Coupling unit 630 includes input and output couplers 632, 634, respectively, and a phase shifter 636, all similar to the arrangement illustrated in FIGS. 2(c) and 3(d) and described previously. FIGS. 6(a) and 6(b) are distinguished, in that in FIG. 6(a), the input to modulation section 620 is a cw carrier signal $P_{cw}$ having the desired output wavelength, while in FIG. 6(b), the input to modulation section 620 is a clock signal $P_{clk}$ that, has the same period $T_{bit}$ as the input signal $P_{in}$ of the two respective devices.

The first significant difference to observe in FIG. 6 is that for the arrangement of FIG. 6(b) to operate properly, the delay introduced by the difference in arms 631 and 633 of the interference section 630 must be a multiple of the bit rate $T_{bit}$. This requirement is not applicable to the arrangement of the present invention as illustrated in FIG. 6(a), in which the delay introduced by difference in arms 631 and 633 of the interference section 630 can be an arbitrary amount, which is advantageously selected to be smaller than the time between time slots of the bit rate $T_{bit}$.

The second significant difference to observe in FIG. 6 is that in the arrangement of FIG. 6(a), a simple cw signal $P_{cw}$, which becomes the new (output) signal wavelength, can be introduced into the device. On the other hand, in the arrangement of FIG. 6(b), a series of clock pulses which becomes the new signal wavelength must be introduced into the device. The delayed interference section is used to constructively or destructively cause interference between the two preceding clock signals, such that the clock is directed into either of the outputs of the delayed interference section.

Finally, in the arrangement of FIG. 6(a), the width of the output pulses is mainly determined by the delay $\Delta t_d$ introduced by the difference in arms 631 and 633 of the interference section 630. By way of comparison, in the arrangement of FIG. 6(b), the width of the output pulses is determined by the width $\Delta t_{clk}$ of the pulses that make up the input clock signal $P_{clk}$.

Various modifications of this invention will occur to those skilled in the art. Nevertheless, all deviations from the specific teachings of this specification that basically rely upon the principles and their equivalents through which the art has been advanced are properly considered within the scope of the invention as described and claimed.

I claim:

1. A delayed interference all-optical wavelength converter arranged to convert a pulsed input signal $P_{in}$ at $\lambda_1$ into a wavelength converted signal $P_{conv}$ at $\lambda_2$, where $\lambda_1$ and $\lambda_2$ are different, comprising
   a modulation section arranged to modulate a signal applied to a first input in accordance with a continuous wave $P_{cw}$ signal having a wavelength $\lambda_2$ applied to a second input,
   an input-signal coupling unit for receiving the pulsed input signal $P_{in}$ and supplying it to one input of the modulation section, and
   a delay interference section arranged to receive the output $P_{int}$ of said modulation section and to transform $P_{int}$ from a primarily phase modulated signal to a primarily amplitude modulated signal,
   wherein a wavelength filtering element for filtering at least a portion of signals having the wavelength $\lambda_1$ of said input signal $P_{in}$ is included in at least one of the modulation section, the input-signal coupling unit and the delay interference section.

2. The invention defined in claim 1 wherein said wavelength filtering element is included in the modulation section.

3. The invention defined in claim 2 wherein said modulation section is arranged to filter inputs signals of wavelength $\lambda_1$ to a greater degree than the filtering of inputs signals of wavelength $\lambda_2$.

4. The invention defined in claim 2 wherein said modulation section includes an absorption material arranged such that it becomes substantially transparent to said continuous wave with wavelength $\lambda_2$ when said input signal with wavelength $\lambda_1$ has a power greater than or comparable to said continuous wave.

5. The invention defined in claim 1 wherein said wavelength filtering element is included in the coupling unit.

6. The invention defined in claim 5 wherein coupling unit is a coupler interposed between said modulation section and said delay interference section, and wherein said input signal $P_{in}$ is introduced into said coupling unit in a counter propagating manner as compared to said continuous wave $P_{cw}$.

7. The invention defined in claim 5 wherein coupling unit is a photo-diode arranged to supply an electrical signal to said modulation section in response to receipt of said input signal $P_{in}$.

8. The invention defined in claim 1 wherein said wavelength filtering element is included in the delay-interference section.

9. The invention defined in claim 1 wherein said wavelength filtering element is accomplished through the interaction of said delay interference section with said modulation section.

10. The invention defined in claim 1 wherein said filtering element is a higher order mode optical filter.

11. The invention defined in claim 1 wherein said modulation section comprises an optically nonlinear medium.

12. The invention defined in claim 11 wherein said optically nonlinear medium changes its optical characteristics under the influence of light.

13. The invention defined in claim 1 wherein said input signal is used to modulate the refractive index of said modulation section.

14. The invention defined in claim 1 wherein said delay interference section is arranged to
   split the signal output from the modulation section into first and second signals,
   delay said first signal relative to said second signal, and
   recombine said delayed first signal with said second signal.

15. The invention defined in claim 1 wherein said delay interference section is arranged to create constructive or destructive interference between the signal output from the modulation section and a delayed version thereof, depending on the relative phase relation therebetween.

16. A delayed interference all-optical wavelength regenerator arranged to reshape a pulsed input signal $P_{in}$ into the wavelength converted signal $P_{conv}$, where the wavelengths of the input signal and the converted signal are the same, comprising
   a modulation section arranged to modulate a signal applied to a first input in accordance with a continuous wave $P_{cw}$ signal applied to a second input,
   an input-signal coupling unit for receiving the pulsed input signal $P_{in}$ and supplying it to one input of the modulation section, and a delay interference section arranged to receive the output $P_{int}$ of said modulation section and to transform $P_{int}$ from a primarily phase modulated signal to a primarily amplitude modulated signal, wherein said regenerator further includes a wavelength filtering element for filtering said input signal $P_{in}$ in at least one of the modulation section, the input-signal coupling unit, and the delay interference section.

17. An integrated optical regenerator arranged to convert a pulsed input signal $P_{in}$ at $\lambda_1$ into a wavelength converted signal $P_{conv}$ at $\lambda_2$, where $\lambda_1$ and $\lambda_2$ are different, comprising a modulator arranged to modulate a continuous wave $P_{cw}$ having a wavelength $\lambda_2$ with said pulsed input signal $P_{in}$, a coupler for optically coupling said pulsed input signal $P_{in}$ to said modulator, and a delay interference section for converting the principally phase modulated output of said modulator to a principally amplitude modulated signal, wherein at least one of said modulator, said coupler and said delay interference section are arranged to filter at least a portion of the optical signals passing through said regenerator having a wavelength $\lambda_1$.

18. A method for conversion of an optical input signal $P_{in}$ into a wavelength converted signal $P_{conv}$, comprising the steps of:

coupling the input signal $P_{in}$ and a continuous wave $P_{cw}$ to provide simultaneous modulation of the continuous wave $P_{cw}$ and filtering of the input signal $P_{in}$ to generate a filtered and modulated signal $P_{int}$;

transforming the filtered and modulated signal $P_{int}$ from a primarily phase modulated signal to a primarily amplitude modulated signal to generate the converted signal $P_{conv}$.

19. A method for conversion of an optical input signal $P_{in}$ into a wavelength converted signal $P_{conv}$, comprising the steps of:

coupling the input signal $P_{in}$ and a continuous wave $P_{cw}$ to provide modulation of the continuous wave $P_{cw}$ to generate a modulated signal $P_{int}$;

processing the modulated signal $P_{int}$ to simultaneously transform the modulated signal $P_{int}$ from a primarily phase modulated signal to a primarily amplitude modulated signal and filter out the input signal $P_{in}$, to generate the converted signal $P_{conv}$.

* * * * *